United States Patent
Schönberg

(10) Patent No.: US 10,675,752 B2
(45) Date of Patent: Jun. 9, 2020

(54) ABSOLUTE ROBOT-ASSISTED POSITIONING METHOD

(71) Applicant: FFT Produktionssysteme GmbH & Co. KG, Fulda (DE)

(72) Inventor: Alexander Schönberg, Fulda (DE)

(73) Assignee: FFT Produktionssysteme GMBH & Co. KG, Fulda (DE)

(*) Notice: Subject to any disclaimer, the term of this patent is extended or adjusted under 35 U.S.C. 154(b) by 125 days.

(21) Appl. No.: 15/296,718

(22) Filed: Oct. 18, 2016

(65) Prior Publication Data
US 2017/0113344 A1    Apr. 27, 2017

(30) Foreign Application Priority Data
Oct. 21, 2015 (DE) .................... 20 2015 105 595 U

(51) Int. Cl.
*B25J 9/00* (2006.01)
*G05B 19/408* (2006.01)
*B25J 9/16* (2006.01)

(52) U.S. Cl.
CPC ............. *B25J 9/0084* (2013.01); *B25J 9/163* (2013.01); *B25J 9/1687* (2013.01); *G05B 19/4083* (2013.01); *G05B 2219/39393* (2013.01); *G05B 2219/40033* (2013.01); *G05B 2219/40306* (2013.01); *G05B 2219/40425* (2013.01)

(58) Field of Classification Search
CPC ..... B25J 9/1687; B25J 9/1676; G05B 19/408; G05B 19/401; G05B 19/4015; G05B 19/4083; G05B 2219/40387; G05B 2219/439393; G05B 2219/40033; G05B 2219/40306; G05B 2219/40425
See application file for complete search history.

(56) References Cited

U.S. PATENT DOCUMENTS

| 7,321,808 B2 | 1/2008 | Nagamatsu |
| 8,706,302 B2 | 4/2014 | Eickhorst |

(Continued)

FOREIGN PATENT DOCUMENTS

| DE | 102006041886 | 3/2008 |
| DE | 102012101497 | 8/2013 |

(Continued)

OTHER PUBLICATIONS

Joseph Polden et al, Offline Porgramming for a Complex Welding System using DELMIA Automation, 2011, University of Wollongong Australia Research Online.*

(Continued)

*Primary Examiner* — Bhavesh V Amin
(74) *Attorney, Agent, or Firm* — McCarter & English, LLP

(57) ABSTRACT

An absolute robot-assisted positioning method is provided which can be performed by a facility. The method optimises an assembly task which has been created theoretically at a computer workstation and which is implemented in reality by the facility. The disclosed facility includes at least one robot, at least one measurement system and a computer, wherein the at least one measurement system monitors the at least one robot while the assembly task is being performed, and the robot and the measurement system are connected to each other via the computer.

18 Claims, 2 Drawing Sheets

(56) References Cited

U.S. PATENT DOCUMENTS

| | | | |
|---|---|---|---|
| 2004/0083010 A1* | 4/2004 | Nagata | B25J 9/1674 |
| | | | 700/1 |
| 2006/0149418 A1* | 7/2006 | Anvari | A61G 13/10 |
| | | | 700/245 |
| 2014/0067121 A1* | 3/2014 | Brooks | B25J 9/1676 |
| | | | 700/255 |
| 2015/0224649 A1 | 8/2015 | Watanabe | |
| 2015/0328774 A1* | 11/2015 | Yajima | B25J 9/1674 |
| | | | 700/261 |

FOREIGN PATENT DOCUMENTS

| | | |
|---|---|---|
| EP | 1553671 | 5/2005 |
| EP | 2333626 | 6/2011 |

OTHER PUBLICATIONS

Muelaner (Meulaner et al, iGPS—An Initial Assessment of Technical and Deployment Capability, Paper presented at 3rd International Conference on Manufacturing Engineering, Kallithea of Chalkidiki, Greece, Jan. 10, 2008-Mar. 10, 2008, pp. 805-810, 2008.*
European Search Report dated Apr. 10 , 2017 for European Patent 16194798.1-1927.
German Serach Report dated Jul. 18, 2016 for German Utility Model Application No. 202015105595.1.

* cited by examiner

ABSOLUTE ROBOT-ASSISTED POSITIONING METHOD

BACKGROUND

1. Technical Field

The invention relates to an absolute robot-assisted positioning method which can be performed by a facility. The method optimises an assembly task which has been created theoretically at a computer workstation and which is implemented in reality by the facility. The disclosed facility comprises at least one robot, at least one measurement system and a computer, wherein the at least one measurement system monitors the at least one robot while the assembly task is being performed, and the robot and the measurement system are connected to each other via the computer.

2. Background Art

Methods for training robots for a predetermined assembly task are already known from the general prior art. One known method is the so-called teaching method, in which the robot and/or robot arm is moved by means of a control panel to desired positions on a movement trajectory which the robot has to travel during the assembly task. The points which are thus travelled to, and/or their co-ordinates, are captured in the robot controller. Each individual processing step is executed in this way, in order to accomplish the assembly task. A program is created from the sum of the processing steps, using which the robot can automatically perform the predetermined assembly task autonomously. If errors occur during assembly, or if parts of the assembly task are changed, the robot has to be taught new movement sequences again via the control panel.

Currently, initialising complex assembly facilities is largely accomplished manually. In the design phase, assembly processes are planned in a virtual environment, which are adapted to the robots involved for the actual processes in a time-consuming procedure. This adapting process compensates for the deviations in the robots and prevents reverse documentation and separation of the deviation factors. Consequently, a new adapting process has to be performed if the facility is exchanged or optimised.

DE 10 2012 009 010 A1 discloses a method for generating a robot movement. In the method, a capture element is manually moved to predetermined positions on the envisaged movement trajectory of the robot. The positions of the capture element are captured in relation to a co-ordinate system which can be predetermined, and a movement trajectory for the robot is ascertained on the basis of the reference points thus obtained. A force and/or torque to be exerted by the robot is also captured at at least one position by means of a capture element and assigned to a reference point in the co-ordinate system which is assigned to said position.

Since it is common to the known methods that they each have a relatively time-consuming program creating process, which has a negative effect on the cost of assembly, there is a need for a facility which is capable of directly implementing a theoretically devised assembly task.

SUMMARY OF THE INVENTION

One aspect of the invention relates to a facility for performing an absolute robot-assisted positioning method for optimising an actual assembly task which is defined by theoretically defined processing steps. The facility comprises: at least one robot, preferably two robots collaborating with each other, which perform(s) the assembly task; at least one measurement system which monitors the parameters such as for example the movement direction, movement speed, exerted force, exerted torque, etc. of the robot; and at least one computer.

The assembly task can, for example, relate to joining together large-volume sub-assemblies, in particular connecting large-area flexible structures to corresponding reinforcement bodies, in order to provide the structure with strength and contour accuracy, even when subject to extreme stresses, during normal operations. The large-volume sub-assembly can in particular be an aircraft fuselage, the large-area flexible structure can in particular be a part of the outer shell of the aircraft, and the reinforcement bodies can in particular be the corresponding ribs or stringers, wherein the facility can advantageously place and connect the ribs onto the aircraft shell with absolute precision completely automatically, i.e. without the need for human intervention.

The robot or robots can be known industrial robots exhibiting for example six degrees of freedom; the measurement system can be a measurement system which is known from the prior art or can combine multiple known measurement systems with each other. If there is more than one robot, all the robots can be of equal standing or there can be one or more master robots and one or more slave robots. Collaboration between two or more robots is enabled by a communications standard which is implemented either in the facility or via additional programs.

The program for executing the assembly task can be created on a computer which is located in an office far away from the facility and not connected to the facility. The programming is generally performed by a team comprising specialists with experience of production facilities and initialising production facilities.

The computer comprises at least a memory unit, a computational unit, a transmission interface and a communications interface and is designed to store a program which describes the theoretically defined assembly task. The computational unit derives individual processing steps from the program, for the robot, for executing the assembly task. If there is more than one robot, subroutines can be derived by means of the computational unit using a predetermined algorithm, wherein each subroutine relates to mutually adjusted processing steps for exactly one of the robots.

The individual processing steps for the robot, and/or the subroutines for each individual robot, are transmitted to the robots via the transmission interface. The robot and/or robots, the measurement system and the sensors are monitored via the communications interface in order to execute the assembly task. To this end, the data or the measurement values of the measurement system are received via the communications interface and stored for further processing and for the purpose of logging, i.e. for documentation purposes. The measurement data received are compared with the predetermined data of/in the program and/or subroutines, wherein if deviations above a predetermined threshold value are detected, the computer decides whether to discontinue or halt the assembly task immediately or at a later time.

The computer can also be designed to determine new nominal values for the program and/or subroutines from the detected deviations and to integrate them into the program and/or subroutines. The new nominal values can then serve as nominal values for the next identical assembly task, i.e. the computer can for example optimise movement parameters of the robot or robots in one or more steps, without the need for human intervention for this purpose.

The computer can separately store the data for each processing step of the robot or for each processing step of the subroutines, such that it is possible to subsequently reconstruct when and how a processing step in the program or subroutine has been modified.

When creating the program, virtual operatives can be defined on the computer at particular points which are critical to the method, such that the computational unit can specifically compare these operatives with the results of the measurement system.

The operatives can be expedients for fulfilling one or more of the tasks, in particular synchronisation tasks, of calibrating, regulating, monitoring and process control, documentation, status management and configuration, wherein actual operatives can be used, such as for example markers which can be identified and captured by one or more of the measurement systems, or the virtual operatives mentioned which are set in the program while programming the theoretical assembly task. By using the operatives, it is possible to eliminate inaccuracies in the facility which cannot be sufficiently specified theoretically due to tolerance chains which are not exactly known, in order to ensure absolute robot-assisted positioning of all the assembly elements during the assembly task. Such a task can for example be that of positioning/connecting ribs on/to a shell of an aircraft, or any other assembly task, for example in the manufacture of automobiles, rail vehicles, watercraft, etc., in which a high level of precision in positioning parts with respect to each other is critical.

The calibration operatives can align co-ordinate systems to each other via nominal and actual points and can determine any shifting, rotating or scaling in relation for example to a base. If positions of the measurement systems are approximately known, the actual points can be recorded automatically, for example by using the nominal point as a movement command to a laser tracker for searching for a retroreflector. For simultaneous calibration, both the base and the tool can be determined via multiple reflectors or directly measured positions and orientations. Mechanical working points can be calibrated to the tool working points on the basis of an artefact. Parameters for force/torque sensors can be derived via reciprocating movements.

The regulating operatives can implement the regulating deviations from programmed points and from linearly programmed trajectories, in sequence with executing the program. Because the deviation from the programmed movement is determined, it is possible to regulate orthogonally with respect to the trajectory movement even with no interfaces with real-time capability. Regulating deviations from the current position are determined in parallel with the runtime of the robot, on the basis of its current position. This determination enables regulating to be performed in all directions, even for dynamic processes, and requires nominal and actual values to be assigned chronologically as well as geometrically. By converting force/torque deviations into geometric deviations using spring constants, force-controlled processes or processes exhibiting an unknown geometry can also be regulated in individual directions.

The monitoring and process control operatives monitor process parameters and provide clearance for subsequent process steps. If measurement systems are not ready for measuring, then they are made ready for measuring again. Process capability is ensured by monitoring the measurement systems. Critical process parameters can be evaluated in auto-adaptive algorithms, in order to continue production, when individual components fail, until the next safe process interruption, with the aid of a trend analysis, and only then embark on repairs.

The documentation operatives document the state of the facility in order to be able to reconstruct the processes and behaviour of the individual components. At the process steps which require clearance, reports on compliance with process specifications are created from the stored process data and edited for sub-assembly documentation and facility optimisation.

Status management operatives can verify the communications capability of the individual components in order to identify system crashes and malfunctions and to communicate error messages. If smaller errors occur which affect processes but only briefly and reversibly interrupt them, warnings are sent to the affected components and processes are launched to restore the normal processes as quickly as possible. Serious errors will lead to the discontinuation of a process or even an emergency stop in order to prevent damage to the facility or the sub-assembly. The state of the components involved in absolute robot-assisted positioning and the state of the facility controller are synchronised in a two-way communication.

Configuration operatives collect facility parameters and document them, so as to be able to reconstruct the changes which have occurred in the individual components and to correlate settings with process results in order to optimise the processes. In the case of changes to sub-assemblies, machines and facilities, new reference values can be entered in order to adapt the geometry. In order to compensate for the effect of subsequent process steps, lead values are entered which are superimposed onto the processes.

In order to monitor, for example, a robot movement, a movement speed and direction of the robot, a force exerted by the robot or an exerted torque, one or more measurement systems are implemented in the facility which take measurements by means of rotary theodolites, a multitude of cameras for observing markers, laser trackers with or without orientation receivers, laser radar or other suitable measuring methods, wherein "rotary theodolites" is understood to mean theodolites which are variable in their position and can for example be pivoted and/or rotated in any direction, like a sphere in a bracket, in order for example to be able to follow the path of an actual operative in three-dimensional space. It is consequently a sort of "indoor GPS", using which an object can be tracked along its movement curve, wherein each position of the object can be captured with absolute precision.

The robot or robots comprise (s) one or more interfaces which are implemented in the facility. Changes to parameters of the robot can be made directly at the facility via these interfaces, by means of the computer or manually via an input device, wherein the program preferably features a user interface which is constructed in such a way that inputs can be made by semi-skilled operators using the input device, i.e. proven experts are not required in order to operate the facility.

Depending on the model of robot used, the interfaces can be a robot sensor interface with access to data at the interpolation cycle rate and the option of influencing a robot movement at programmed points and while it is travelling its trajectory, or it can be an XML interface of the robot controller which enables runtime data of the robot controller to be accessed and the robot movement to be influenced at programmed points, or it can be a .net client, such as for example Windows Store (WinRT), WPF or Silverlight etc., in a Windows environment of the robot controller, which provides access to runtime data of the robot controller via a virtual network connection to the real-time kernel of the controller, thus enabling the robot movement to be influenced at programmed points. Alternatively, a robot reference interface can provide access to data at the interpolation cycle rate and enable a robot movement to be influenced at programmed points, wherein option-extended guided motion can enable a robot movement to be influenced at programmed points and while it is travelling its trajectory. A PC interface can enable access to runtime data of the robot controller, thus enabling the robot movement to be influenced at programmed points. In the case of another robot, user socket messaging and/or a PC software development kit (SDK) provide access to runtime data of the robot controller. This enables the robot movement to be influenced at programmed points.

During the trajectory movement, dynamic path modifiers have to be used for influencing. In the case of another robot system, a native XML interface provides access to runtime data of the robot controller and enables the robot movement to be influenced at programmed points. Via the sensor function, influencing is possible during a robot movement. Bus systems (Profibus, PROFINET, EtherCAT, etc.) provide robot-independent access to the robot controller, thus enabling the robot movement to be influenced at programmed points.

The facility can be put into operation for the first time automatically by means of the computer. Putting the facility into operation is automated using measurement technology and is reversibly documented. This simplifies putting the facility into operation and allows machine errors and process errors to be separated.

The facility can be initialised for the first time automatically by means of the computer. The initialisation is automated using measurement technology and is reversibly documented. This simplifies initialising the facility and allows machine errors and process errors to be separated.

The at least one robot and the at least one measurement system form a network of individual systems which communicate with each other and using which autonomous partial aspects of the actual assembly task—and, when all the partial aspects interact, the actual assembly task—can be performed optimally within the meaning of the theoretically defined assembly task.

Another aspect relates to a method, which is not claimed, which can be performed with the aid of the facility described above. The method can comprise the following aspects:

Aspect 1 An absolute robot-assisted positioning method for optimising an assembly task, which is determined by theoretically defined steps, by means of at least one robot, wherein:
  in a first step, a program comprising the theoretically defined steps for the assembly task is inputted into a memory element of a computer which is connected to the robot;
  in a second step, individual processing steps are derived by a computational unit of the computer from the program, for the robot, for executing the assembly task;
  in a third step, the program is transmitted to the robot and preferably stored in a memory unit specific to the robot;
  in a fourth step, the robot performs one processing step at a time, under the control of the program, and the measurement system monitors each of the processing steps performed by the robot and transmits the measurement data for each processing step to the computer;
  the captured measurement data for each processing step are stored in the computer and compared by a computational unit with the data, stored in the memory element, of the theoretically defined steps of the assembly task;
  and in a fifth step, the program for the assembly task is optimised by the computational unit on the basis of the data measured by the measurement system and is stored as a separate program, and optimised processing steps are derived from the optimised program and transmitted to the robot for the next assembly task.

Aspect 2 An absolute robot-assisted positioning method for optimising an assembly task, which is determined by theoretically defined steps, by means of at least two robots collaborating with each other, wherein:
  in a first step, a program comprising the theoretically defined steps for the assembly task is inputted into a memory element of a computer which is connected to the robots;
  in a second step, subroutines for executing mutually adjusted individual processing steps of the assembly task are derived by a computational unit of the computer from the program, for each individual robot;
  in a third step, the subroutines are transmitted to the robots and preferably stored in a memory unit specific to the robots;
  in a fourth step, the robots perform one processing step at a time, under the control of the subroutines, and the measurement system monitors each of the processing steps performed by each robot and transmits the measurement data for each processing step to the computer;
  the captured measurement data for each processing step are stored in the computer and compared by a computational unit with the data, stored in the memory element, of the theoretically defined steps of the assembly task;
  and in a fifth step, the program for the assembly task is optimised by the computational unit on the basis of the data measured by the measurement system and is stored as a separate program, and optimised subroutines are derived from the optimised program and transmitted to the robots for the next assembly task.

Aspect 3 A method according to Aspect 1 or Aspect 2, wherein when defining the theoretical steps, virtual operatives are used which calibrate the data measured by the measurement system to the theoretical program data, wherein deviations, detected by the virtual operatives, between the data represented by the operatives and the measurement data are captured and stored by the computer.

Aspect 4 A method according to any one of the preceding aspects, wherein the robot or robots and the measurement system form a network of individual systems which communicate with each other, using which autonomous partial aspects of the actual assembly task—and, when all the partial aspects interact, the actual assembly task as a whole—are solved optimally within the meaning of the theoretically defined assembly task.

Aspect 5 A method according to any one of the preceding aspects, wherein machine errors and process errors, in particular when initialising an assembly facility, are separately ascertained and reconstructibly stored and therefore documented using the method.

Aspect 6 A method according to any one of the preceding aspects, wherein ribs are automatically connected to a large-area flexible structure using the method, wherein the structure is preferably a part of a large-volume sub-assembly.

Aspect 7 A method according to the preceding aspect, wherein the sub-assembly is a an aircraft fuselage, the structure is a part of the outer shell of an aircraft, and the rib is a so-called stringer.

Aspect 8 The use of the facility for connecting a large-area flexible structure, which is preferably a part of a large-volume sub-assembly, to a reinforcement element.

Aspect 9 The use of the facility according to the preceding aspect, wherein the large-volume sub-assembly is an aircraft fuselage, the large-area flexible structure is a part of the outer shell of an aircraft, and the reinforcement element is a rib or stringer.

Other aspects of the method, which are likewise not claimed, can be gathered from the description of the facility in accordance with the first aspect, and the facility can correspondingly be advantageously developed by technical features which are only described in the method which is not claimed.

BRIEF DESCRIPTION OF THE FIGURES

Example embodiments of the invention will now be described on the basis of figures. The figures relate to selected examples of facilities. The scope of the invention is not limited to the embodiments shown. Features which are critical to the invention and which can only be gathered from the figures form part of the scope of the disclosure and can advantageously develop the subject-matter of the application, on their own or in combinations shown. The individual figures show.

DESCRIPTION OF EXEMPLARY EMBODIMENTS

Figure 1:
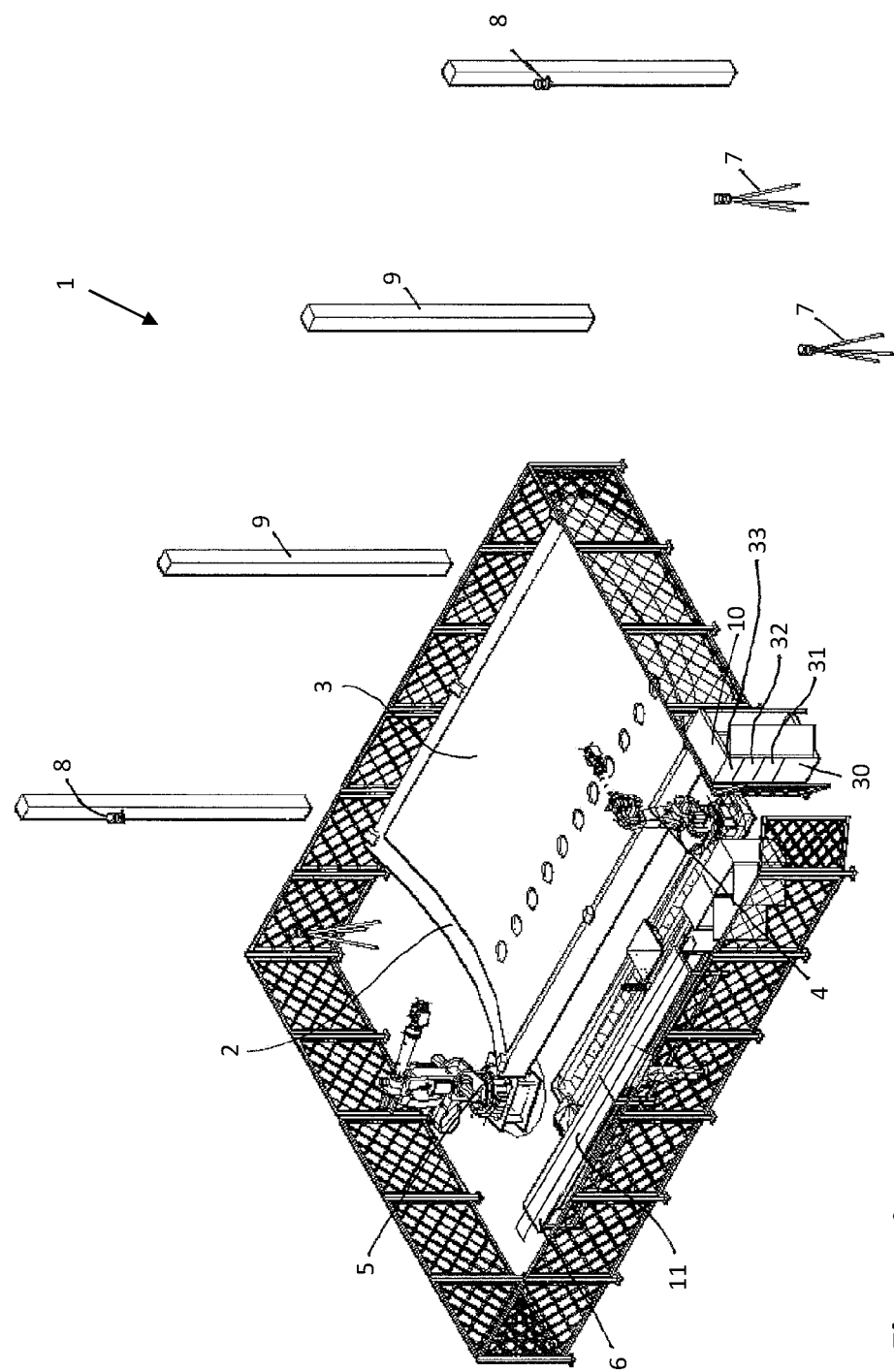
FIG. 1 a facility comprising two robots.

FIG. 1 shows a facility 1, comprising: a tool 2 on which a large-area sub-assembly 3—in this case, a part of an aircraft shell—lies; two robots 4, 5; and a depository 6. The facility 1 also comprises: a measurement system, which consists of the measurement systems 7, 8 and 9; and a computer 10.

The sub-assembly 3 is a part of an outer shell of an aircraft fuselage which is to be reinforced with ribs or stringers 11. A first rib 11, which has been placed on the depository 6 by other robots which are not shown, can be gripped and placed on the sub-assembly 3 by the robots 4, 5. It has to be placed or positioned on the sub-assembly 3 with absolute precision.

In order for this to be possible, the facility 1 comprises multiple measurement systems 7, 8, 9 which monitor the movements—i.e. a direction of the movement, a speed of the movement, a distance travelled during the movement, a torque, a pressure force and other parameters—of the robots. The measurement systems 7, 8, 9 can for example comprise theodolites, cameras, laser trackers and/or laser radar, in order to monitor in detail the individual processing steps of the robots collaborating with each other.

The assembly task is created theoretically at a workstation, which is not shown, for example using a CAD program or textual programming. The finished program is then inputted into a memory unit 31 of the computer 10 and comprises the theoretical nominal data for executing all the individual processing steps for fulfilling the assembly task.

The computer 10 comprises a computational unit 30. The computational unit 30 can comprise the memory unit 31, a transmission interface 32 and a communications interface 33. The computational unit 30 derives subroutines for each of the two robots 4, 5 collaborating with each other from the program which is stored in the memory unit 31, wherein said subroutines represent the individual adjusted processing steps of the respective robot. These subroutines are transmitted to the two robots 4, 5 via the transmission interface 32.

The assembly task is, for example, that the two robots 4, 5 pick up the stringer 11 from the depository 6, place the stringer 11 on the sub-assembly 3 in an absolutely precise position, and preferably connect it to the sub-assembly 3. To this end, a virtual co-ordinate system of the aircraft can for example be spanned with the aid of the measurement systems 7, 8, 9 and virtual and/or actual operatives, wherein the sub-assembly 3 is positioned in an absolutely precise position, and the stringers 11 can consequently also be placed in an absolutely precise position on the sub-assembly 3, in said co-ordinate system.

Since it is not possible to assemble the stringers 11 in an absolutely precise position on the sub-assembly 3 using the robots 4, 5 alone due to tolerance chains, the assembly precision is achieved by the measurement systems 7, 8, 9 monitoring all the movements of the robots 4, 5 and transmitting the measurement results obtained to the computer 10 via the communications interface 33. These measured actual data of the robot movement can be compared in the computational unit 30 with the predetermined nominal data of the theoretically created program. If this comparison reveals deviations between the actual movement and the nominal movement, the program can generate changes in order for example to automatically adapt the measured actual value to the predetermined nominal value of the theoretical programming, by modifying for example one parameter of the robot movement, and/or to automatically optimise one or more processing steps of the robots 4, 5 collaborating with each other.

Figure 2:
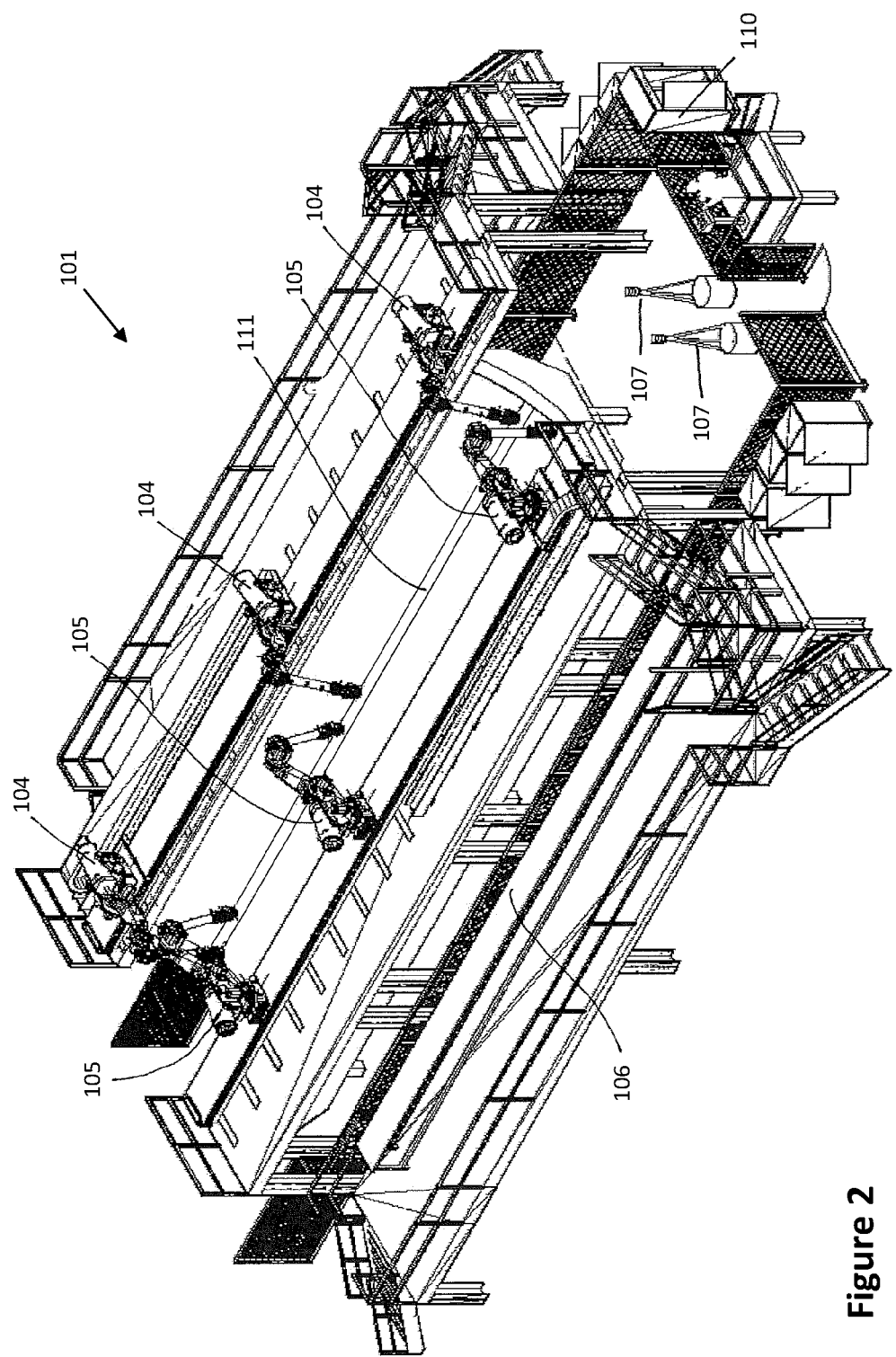
FIG. 2 a facility comprising six robots.

FIG. 2 relates to a facility 101 comprising six robots 104, 105 which collaborate with each other and collectively place stringers 111 on a sub-assembly. Each of the robots 104, 105 has for example six degrees of freedom. In this facility 101, the robot movements and other parameters of the robots 104, 105 are again monitored by one or more measurement systems. In FIG. 2, only the measurement system 107 is shown. Other measurement systems can for example be attached to a ceiling (not shown) and/or a wall (not shown). This facility 101 also comprises a computer 110 which corresponds to the computer 10 of FIG. 1 and is therefore not described again here. The assembly task is also executed in a way corresponding to the assembly task described with respect to FIG. 1, other than that the collaboration between six robots 104, 105 and monitoring the parameters of all six robots 104, 105 is more complex than if there are only two robots 4, 5 collaborating with each other.

Instead of the two robots 4, 5 shown in FIG. 1 or the six robots 104, 105 shown in FIG. 2, any other expedient number of robots can be selected in accordance with the specific task, including for example one robot only, together with a measurement system which consists of one (FIG. 2) or more (FIG. 1) measurement systems.

LIST OF REFERENCE SIGNS 1, 101 facility
2 tool
3 sub-assembly
4, 104 robot
5, 105 robot
6, 106 depository 7, 107 measurement system
8 measurement system
9 measurement system
10, 110 computer
11, 111 stringer
30 computational unit
31 memory unit
32 transmission interface
33 communications interface Although the present invention has been described with reference to exemplary embodiments and implementations thereof, the present invention is not limited by or to such exemplary embodiments and implementations, as will be readily apparent to persons skilled in the art from the detailed description provided herein.

The invention claimed is:

1. An absolute robot-assisted positioning method for initialising a facility, comprising at least one robot, at least one measuring system, and at least one computer, and for optimising an assembly task, which is determined by theoretically defined steps, by means of the at least one robot, wherein:
   in a first step, a program comprising the theoretically defined steps for the assembly task is inputted into a memory element of the computer which is connected to the robot;
   in a second step, individual processing steps are derived by a computational unit of the computer from the program, for the robot, for executing the assembly task;
   in a third step, the program is transmitted to the robot and stored in a memory unit specific to the robot;
   in a fourth step, the robot automatically performs one processing step at a time, under the control of the program, and the measurement system monitors each of the processing steps performed by the robot and transmits the measurement data for each processing step to the computer;
   wherein the captured measurement data for each processing step are stored in the computer and compared by a computational unit with the data of the program, stored in the memory element, of the theoretically defined steps of the assembly task; and
   in a fifth step, the program for the assembly task is optimised by the computational unit on the basis of the data measured by the measurement system and is stored as a separate program, and optimised processing steps are derived from the optimised program and transmitted to the robot for the next assembly task.

2. A facility for performing the method according to claim 1, wherein the facility comprises:
   a. at least one robot or at least two robots which collaborate with each other to perform the assembly task;
   b. at least one measurement system which monitors the parameters of the robot;
   c. at least one computer; and
   d. at least one sensor;
   e. wherein the computer comprises at least a memory unit, a computational unit, a transmission interface and a communications interface and is designed to:
      store a program which describes the theoretically defined assembly task,
      derive mutually adjusted processing steps or subroutines from the program by means of the computational unit using a predetermined algorithm, wherein each subroutine relates to mutually adjusted processing steps for exactly one robot,
      transmit the program to the robot or robots via the transmission interface,
      monitor the robot or robots, the measurement system and the sensors via the communications interface in order to execute the assembly task,
      receive measurement data of the measurement system via the communications interface and store them for documentation purposes, and
      compare said received measurement data with the predetermined data and, if there are any deviations above a predetermined threshold value, decide whether to discontinue or halt the assembly task immediately or at a later time.

3. The facility according to claim 2, wherein the computer is also designed to determine new nominal values for the program/subroutines from the detected deviations and to integrate them into the program/subroutines.

4. The facility according to claim 2, wherein the computer separately stores the data for each derived processing step of the program/subroutines, such that it is possible to subsequently reconstruct when and how a processing step in the program/subroutine has been modified.

5. The facility according to claim 2, wherein when creating the program, virtual operatives are defined at particular points which are critical to the method, such that the computational unit can specifically compare these operatives with the results of the measurement system.

6. The facility according to claim 2, wherein the operatives are expedients for fulfilling one or more of the tasks, wherein the one or more tasks are defined as synchronisation tasks, wherein the synchronisation tasks further comprise calibrating, regulating, monitoring and process control, documentation, status management and configuration.

7. The facility according to claim 2, wherein the robots comprise one or more interfaces, and changes to the robot movements can be made by means of the computer via the interfaces.

8. The facility according to claim 2, wherein the program is created by means of textual, CAD-assisted programming, or textual and CAD-assisted programming and can be modified even while the facility is in operation, without thereby altering the theoretically defined assembly task.

9. The facility according to claim 2, wherein the robots and the at least one measurement system form a network of individual systems which communicate with each other.

10. The facility according to claim 2, wherein in order to monitor the robot movements, one or more measurement systems are implemented in the facility which take measurements by means of rotary theodolites or indoor GPS, a multitude of cameras for observing markers, laser trackers with or without orientation receivers, or laser radar.

11. The method according to claim 1, wherein when defining the theoretical steps, virtual operatives are used which calibrate the data measured by the measurement system to the theoretical program data, wherein deviations, detected by the virtual operatives, between the data represented by the operatives and the measurement data are captured and stored by the computer.

12. The method according to claim 1, wherein the robot or robots and the measurement system form a network of individual systems which communicate with each other, using which autonomous partial aspects of the actual assembly task and, when all the partial aspects interact, the actual assembly task as a whole are solved optimally within the meaning of the theoretically defined assembly task.

13. The method according to claim 1, wherein machine errors and process errors, in particular when initialising an assembly facility, are separately ascertained and reconstructibly stored and therefore documented using the method.

14. The method according to claim 1, wherein ribs are automatically connected to a large-area flexible structure using the method, wherein the structure is a part of a large-volume sub-assembly.

15. The method according to claim 14, wherein the sub-assembly is an aircraft fuselage, the structure is a part of the outer shell of an aircraft, and the rib is a stringer.

16. The use of the method according to claim 14 as part of a facility for connecting a large-area flexible structure, which is a part of a large-volume sub-assembly, to a reinforcement element.

17. The use of the method according to claim 16, wherein the large-volume sub-assembly is an aircraft fuselage, the large-area flexible structure is a part of the outer shell of an aircraft, and the reinforcement element is a rib or stringer.

18. An absolute robot-assisted positioning method for initialising a facility, comprising at least two robots, at least one measuring system, and at least one computer for optimising an assembly task, which is determined by theoretically defined steps, by means of the at least two robots collaborating with each other, wherein:

in a first step, a program comprising the theoretically defined steps for the assembly task is inputted into a memory element of the computer which is connected to the robots;

in a second step, subroutines for executing mutually adjusted individual processing steps of the assembly task are derived by a computational unit of the computer from the program, for each individual robot;

in a third step, the subroutines are transmitted to the robots and preferably stored in a memory unit specific to the robots;

in a fourth step, the robots perform automatically one processing step at a time, under the control of the subroutines, and the measurement system monitors each of the processing steps performed by each robot and transmits the measurement data for each processing step to the computer;

the captured measurement data for each processing step are stored in the computer and compared by a computational unit with the data of the program, stored in the memory element, of the theoretically defined steps of the assembly task;

and in a fifth step, the program for the assembly task is optimised by the computational unit on the basis of the data measured by the measurement system and is stored as a separate program, and optimised subroutines are derived from the optimised program and transmitted to the robots for the next assembly task.

* * * * *